March 25, 1947.   F. J. WALTERS ET AL   2,417,849
ROLLER FENDER FOR PONTOONS
Filed Sept. 26, 1945
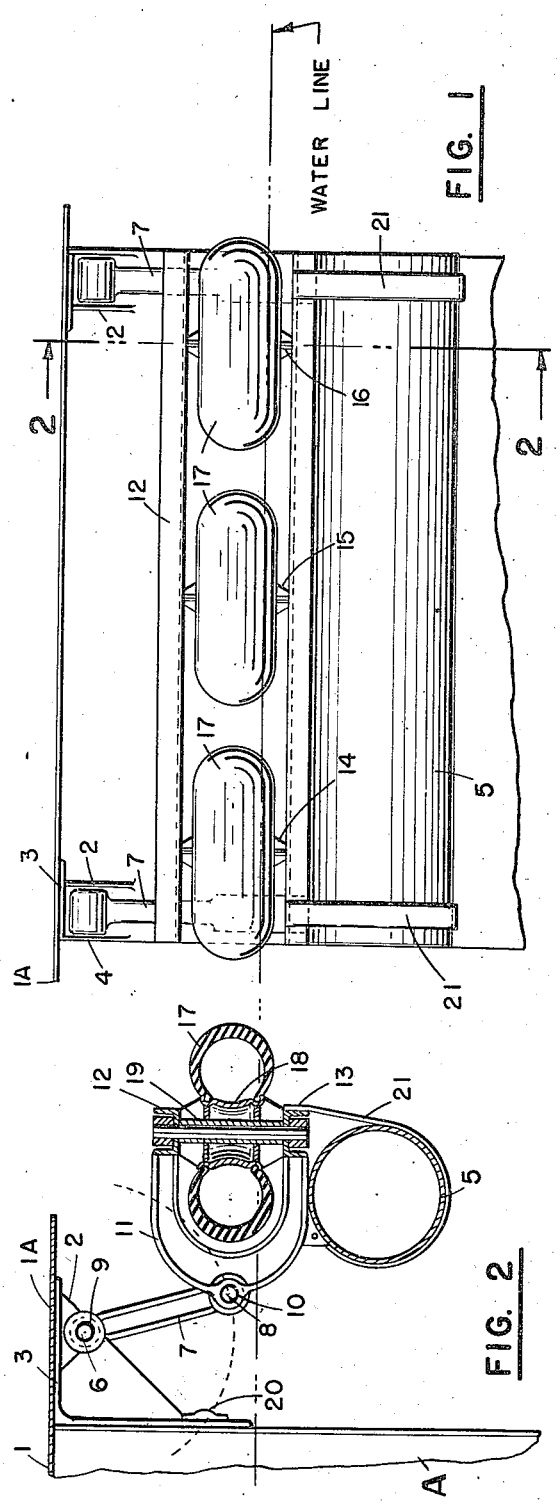
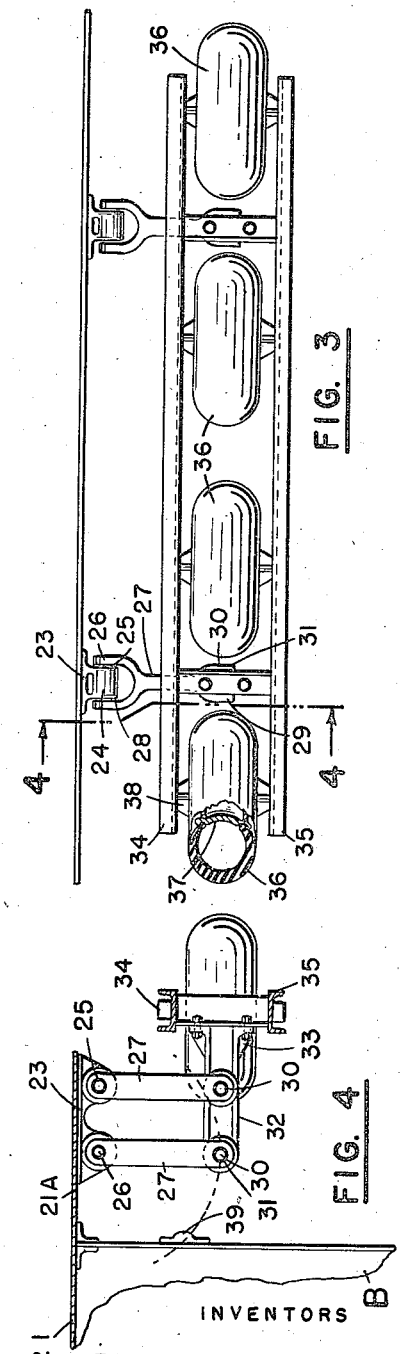
INVENTORS
FRANK J. WALTERS
HOMER B. NELSON
BY
ATTORNEY Patented Mar. 25, 1947

2,417,849

UNITED STATES PATENT OFFICE 2,417,849

ROLLER FENDER FOR PONTOONS

Frank J. Walters and Homer B. Nelson,
United States Navy

Application September 26, 1945, Serial No. 618,801

6 Claims. (Cl. 114—220)

(Granted under the act of March 3, 1883, as amended April 30, 1928; 370 O. G. 757)

This invention relates to improvements in automatically operative shock absorbing devices of the bumper type attachable to both the floating and anchored type docks.

A principal object of the present invention is to provide a dock, pontoon, or any other type landing for surface vessels and seaplanes with a shock absorbing device which is both automatic and effective in operation so as to reduce to a minimum the shock or blow received by the craft coming alongside the landing.

A further object is to provide a device for landings which has positive buoyancy and maintains itself at its most effective position at all times for absorbing the blow administered by a craft coming alongside.

These and other objects and advantages of the invention will be apparent from the following specification taken with the accompanying drawings, wherein like numerals refer to like parts and in which:

Fig. 1 is a front view in elevation of the device;

Fig. 2 is a cross-sectional view taken along 2—2 of Fig. 1;

Fig. 3 is a front elevational view of a modification of the present invention;

Fig. 4 is a cross-sectional view of the modification of the invention taken along 4—4 of Fig. 3.

As shown by Figs. 1 and 2, numeral 1 refers to a dock or pontoon deck plate having an overhang portion 1—A on the underside of which there is a pair of spaced hangers 2 welded or otherwise secured thereto. Each of the hangers 2 consists of a base plate 3 with two triangular end plates 4, 4 spaced apart having openings therethrough to receive a pin 6 upon which one end of a torque arm 7 pivots. The lower or free end of torque arm 7 is pivotally mounted by a pin 8 at the butt end of a U-shaped support 11. The torque arms 7 are each provided with rubber bushings 9 and 10 at their pivots to provide resistance to the torsional forces to which the device is subjected. Extending between each of the free ends of the U-shaped supports 11 are channel irons 12 and 13 welded thereto to form a pair of parallel supports for the tire assemblies 14, 15 and 16. Though the drawings show three such assemblies, it is to be understood that any number of such assemblies may be utilized. Each of the tire assemblies consists of a low pressure pneumatic tire 17 mounted on a rim 18 which in turn is rotatably mounted on a shaft 19 whose ends are received by openings in the channel irons 12 and 13. A buoyancy tank 5 is mounted below the U-shaped supports 11 by means of a pair of metal straps 21, 21 secured to the lower portion of the U-shaped supports 11. A pair of rubber bumper pads 20 is mounted on the side wall of the dock or pontoon A and is positioned thereon so as to receive a blow from the butt end of the U-shaped supports 11 when a surface vessel or seaplane strikes the bumper assembly as the ship comes alongside the dock.

Now referring to Figs. 3 and 4 wherein a modification of the present invention is shown, a dock or pontoon B has a deck 21 with an overhang portion 21—A extending beyond the side wall 22 of the dock B. Secured to the underside of the deck 21—A there is a pair of hangers 23 having a bracket 24 with a cylindrical bore therethrough to receive a rubber bushing 25 and a pin 26 rotatably mounted therein. Two torque arms 27—27 having bifurcated portions 28—29 at each end thereof are secured to the rotatable pins 26 at one end and at the other end on rotatable pins 30 mounted within rubber bushings 31 set in bores in a support lever 32. The free end of each of the levers 32 is bolted to a vertically positioned unequal leg angle iron 33, extending longitudinally along the side of the dock B, and welded to the top and bottom of the leg angle irons 33 are channel irons 34—35 forming an upper and lower support for a plurality of tire assemblies. Each of the tire assemblies consist of a low pressure pneumatic tire 36 mounted on a rim 37 which is secured to a shaft 38, having its ends rotatably mounted in bores extending through the channel irons 34 and 35. A rubber bumper 39 is mounted on the side wall of the dock B in line of travel of the lever 32 so as to absorb blows imparted to the tires 36 by a surface vessel or seaplane as the device swings from its neutral position to the extreme position in absorbing the blow imparted to the device.

While the forms of mechanism herein shown and described constitute the preferred forms of improvement of the present invention, it is understood that other forms might be adapted, all coming within the scope of the claims which follow:

The invention described herein may be manufactured and used by or for the Government of the United States of America for governmental purposes without the payment of any royalties thereon or therefor.

What we claim is:

1. A buffer system for a pontoon having an overhang deck portion comprising a torque arm, means pivotally mounting said torque arm on the underside of said overhang, a support, means pivotally mounting said support to the free end of said torque arm, a pneumatic tire, means rotatably mounting said tire on said support, a shock absorbing means mounted on a side wall of said pontoon in line of travel of the free end of said torque arm.

2. A buffer system for a pontoon having an overhang deck portion comprising torque arms, means pivotally mounting said torque arms on the underside of said overhang, a support, means pivotally mounting said support to the free end of said torque arms, a plurality of pneumatic tires, means rotatably mounting said tires on said support, shock absorbing means mounted on a side wall of said pontoon in line of travel of the free end of said torque arm.

3. A buffer system for a pontoon having an overhang deck portion comprising a torque arm, means pivotally mounting said torque arm on the underside of said overhang, a support, means pivotally mounting said support to the free end of said torque arm, a pneumatic tire, means rotatably mounting said tire on said support, a shock absorbing means mounted on a side wall of said pontoon in line of travel of the free end of said torque arm, means secured to said support adapted to provide said supports with positive buoyancy.

4. A buffer system for a dock having an overhang deck portion comprising a hanger secured to the underside of said overhang deck portion, a pin secured to said hanger, a torque arm having a rubber bushing pivotally mounted on said pin, a U-shaped support, a pin fixed to the butt end of said U-shaped support, a rubber bushing secured on a free end of the torque arm rotatably mounted on said last named pin, a pair of spaced angle irons secured to the legs of the U-shaped support, a low pressure pneumatic tire rotatably mounted by the said channel irons, a buoyancy tank secured under the lower leg of said U-shaped support, and a rubber bumper mounted on a side wall of said dock in line of travel of the butt end of said U-shaped support.

5. A buffer system for a dock having an overhang deck portion comprising a pair of hangers secured to the underside of said overhang, a pin secured to each of said hangers, a pair of torque arms each having a rubber bushing pivotally mounted on said pins, a pair of U-shaped supports, a pin fixed to the butt end of each of said U-shaped supports, a pair of rubber bushings secured at the free ends of the torque arm rotatably mounted on said last named pins, a pair of spaced angle irons secured to the ends of the legs of the U-shaped supports, a plurality of low pressure pneumatic tires rotatably mounted between said channel irons, a buoyancy tank secured below said U-shaped supports and a rubber bumper mounted on the side wall of said dock in line of travel of the butt end of said U-shaped supports.

6. A buffer system for a floating dock having an overhang deck portion comprising a hanger mounted on the underwall of said overhang, a bracket secured to said hanger having a set of bores therethrough adapted to receive rubber bushings, a pair of torque arms bifurcated at each, and a pin secured to the bifurcated portion of said torque arms rotatably mounted within said rubber bushings, a support arm having a set of bores therethrough, rubber bushings received by said bores, a set of pins secured on the free ends of said torque arms rotatably mounted in said last named bushings, a vertically disposed unequal leg angle iron secured to said support arm, a pair of spaced channel arms secured to the top and bottom respectively of said angle irons, a plurality of low pressure pneumatic tires rotatably mounted between said channel irons, and a rubber bumper mounted on the side wall of said dock in line of travel of said support arm.

FRANK J. WALTERS.
HOMER B. NELSON.